United States Patent Office 2,950,271
Patented Aug. 23, 1960

2,950,271
ALCOHOLYSIS OF POLYVINYL ACETATE

James M. Snyder, Memphis, Tenn., assignor to E. I. du Pont de Nemours and Company, Wilmington, Del., a corporation of Delaware No Drawing. Filed June 29, 1954, Ser. No. 440,291

8 Claims. (Cl. 260—91.3)

This invention relates to the alcoholysis of polyvinyl acetate to polyvinyl alcohol of predetermined degrees of alcoholysis.

There is a considerable art dealing with the conversion of polyvinyl esters, particularly polyvinyl acetate, to polyvinyl alcohol by alcoholysis or hydrolysis reactions. The preparation of polyvinyl alcohol by alkaline catalyzed alcoholysis of methanol solutions of polyvinyl acetate is conducted at temperatures in the range between about 30 to 60° C. In this temperature range, three distinct phases occur successively as alcoholysis proceeds. Starting as a homogeneous solution the solubility of the polymer ester in methanol decreases as increasing numbers of ester groups are converted to hydroxyl. When the alcoholysis reaches about 40 to 50% of the ester groups, the polymer partially precipitates as a gelatinous material. If this gel is allowed to stand undisturbed, alcoholysis proceeds and the product is obtained in a massive, unworkable form. However, if the gel is worked mechanically during this range above about 40% alcoholysis, the polymer will break down to a more or less finely divided solid insoluble in the alcohol.

According to this procedure to obtain the polyvinyl alcohol in a form that can be conveniently handled it is necessary to exert much energy by way of agitating the reaction mass. Special mixing devices which can deliver large amounts of power, in the order of 200 to 400 H.P. per 1000 gallons of polymer solution, are required to handle concentrated solutions, above about 15% by weight, of polyvinyl acetate in methanol at temperatures between about 30 to 60° C. Dilute solutions of gel content below about 5% can be handled at lower power input and more conventional equipment can be used. However, in this case large solvent handling requirements coupled with lower productivity greatly increase the cost of the product.

There is a need, accordingly, for an economical process which would permit alcoholysis of polyvinyl ester in more conventional equipment at low power input per unit of polyvinyl alcohol to produce a product of any desired degree of alcoholysis.

It is an object of this invention to provide a process for the alkaline alcoholysis of polyvinyl ester to any degree desired without the need for large power input during the gel phase. Another object is to provide a process which can be carried out in relatively inexpensive equipment. A further object is the production of polyvinyl alcohol by the alkaline alcoholysis of polyvinyl acetate in concentrated methanol solutions with decreased power input during the gel phase. A still further object is to produce both partially and completely hydrolyzed polyvinyl alcohol products in forms suitable for handling without the need for excessive power input. Other objects will appear as the invention is further outlined.

These and other objects of this invention can be accomplished by conducting the alcoholysis of 30 to 65% by weight solutions of polyvinyl esters, particularly polyvinyl acetate, in alcohol and in the presence of alkaline alcoholysis catalyst at temperatures between about 90 and 100° C.

It was discovered that temperature is a sensitive variable affecting the power required for the mechanical breakdown of the gel formed during the alcoholysis reactions. It was found that as the temperature of the alcoholysis mixture reaches 90 C. or higher the gel can be easily broken down with conventional agitator equipment at a power input as low as 10 H.P. per 1000 gallons of polymer solution charge.

Approximately at 90° C. at transition in the gel structure of partially alcoholyzed polyvinyl acetate in methanol occurs. The mixture loses its previous rigidity and strength at temperatures below about 90° C. and the viscosity decreases from several thousand poises to less than 100 poises. This decrease in gel strength is coupled with a rapid rate of alcoholysis reaction which in turn is a function of both temperature and catalyst concentration. Operation at these elevated temperatures permits the use of conventional types of agitation equipment at low power input for the production of finely divided polyvinyl alcohol by alkaline catalyzed alcoholysis of concentrated solutions of polyvinyl acetate in methanol.

By way of example, a one gallon autoclave equipped with an anchor type agitator was charged with 1360 grams of a methanol solution containing 33% solids by weight of a high viscosity polyvinyl acetate. The charge was then heated to about 100° C. at autogenous pressure with the stirrer rotating at 250 r.p.m. and 0.018 mole of sodium methylate as a 5% solution in methanol was then blown into the charge. After 13 minutes the autoclave was cooled and opened. The product was a fine, granular easily handled slurry which on analysis showned a saponification number of 154. A similar run at 80° C. resulted in a stalled agitator and the product was a solid gel difficult to handle.

Operation at high temperatures makes possible more uniform alcoholysis of polyvinyl acetate so as to obtain more constant quality of product because the catalyst can be admixed more quickly and uniformly at the higher temperature as the viscosity is lower than at the heretofore usual operating temperature at or below about 60° C.

The degree of alcoholysis desired in the product can be obtained by adjusting the amount of catalyst used and by stopping the reaction at the proper time depending upon the particular process installation. The reaction can be stopped by conventional methods such as addition of acid to destroy the catalyst or using a catalyst mixture which will lose its activity after a given period of time.

Methanol is the preferred solvent. Ethanol can be used. Since at the temperature of operation the vapor pressure of the solvent rises above atmospheric, it is necessary to use a system which will withstand the internal pressures developed by the reaction mixture. In general, pressures will remain below about 5 atmospheres.

As alcoholysis catalyst, alkali metal alcoholate, particularly sodium methylate, has been found most satisfactory. The invention is, however, not restricted as to the particular alcoholysis catalyst. Any catalyst which will effectively accelerate the alcoholysis of polyvinyl acetate can be used.

In general, by using the process of this invention, the product will be obtained as a solid powder or particulate product in slurry form in the reaction solvent. The size of the particle will be a function of the rate of stirring during the gel stage of reaction. The rate of stirring in its turn will require a certain power input depending upon the rate and amount of stirring required to produce a product of a particular particle size. Other factors having an influence upon product particle size will be concentration of polymer in solvent and rate of reaction as determined by temperature and catalyst activity or concentration.

The alcoholysis reaction is preferably conducted within a temperature range between about 90 and 100° C. If lower concentration of polymer in solvent is used, the gel will be workable with conventional stirring equipment at lower temperatures, in practice as low as 85° C. or even down to 80° C. However, it is more economical to operate with higher solution concentration. Temperatures above 100° C. (e.g. up to 150° C.) may be used but the vapor pressure of the solvent rises rapidly and this will require stronger equipment and costs will go up. Also, as higher temperatures are used the rate of reaction and, therefore, the degree of alcoholysis becomes more difficult to control.

This process may operate over a wide range of polymer concentration in solvent. However, it is more economical to operate in the range between about 30 to 65% by weight of polymer in solvent. In this concentration range optimum effects by way of low power input, high production rates, conventional equipment and control of percentage of alcoholysis can be achieved by operating at a temperature above 85° C. and preferably in the range between about 90° and 100° C.

The preferred range of polyvinyl acetate concentration will vary somewhat with the viscosity. For a high viscosity polymer the preferred concentration will be between about 20 to 40% by weight whereas for a low viscosity polymer the range will be between about 50 to 70% by weight. For intermediate viscosities the preferred range will vary correspondingly within these limits.

Maximum concentration of polyvinyl acetate at which the present process will operate with a low power input per unit of production will also vary with the viscosity of the polymer. Thus, with polymer of high viscosity, the maximum concentration of polyvinyl acetate in the solution will be about 45% by weight whereas with low viscosity polymer, the maximum will be around 75% concentration by weight. For intermediate viscosities, the maximum concentration will lie intermediate these percentage concentration figures.

In the case of high viscosity polyvinyl acetate solutions in methanol conventional stirring equipment will break the gel formed if the temperature is at around 90° C. and the concentration of polymer is up to 45% by weight. At a concentration of about 3% of polymer, practically no power is required to break the gel. At 40° to 60° C. a power input of 200 to 400 h.p. and special design of stirring equipment is required to break the gel with concentrations between about 15% and 40% by weight per 1000 gallons of solution. At 90–100° C. a power input of 10 to 100 h.p. is required for the same gel concentrations and ordinary stirring equipment will be satisfactory.

For any particular set of reaction conditions, such as catalyst and polymer concentrations and reaction temperature, the power input will reach a peak and will thereafter decline. This power peak always occurs at a saponification number of about 190. It is, therefore, possible to stop the alcoholysis at any desired percentage of conversion of acetate groups to hydroxyl groups by inactivating the catalyst at a predetermined time before, at or after the power peak. The reaction will have proceeded to the same degree in a given apparatus when the conditions of reaction have been held substantially identical so that a product of predetermined alcoholysis can be produced as desired. The catalyst can be inactivated by acidification or neutralization by appropriate addition of an acid.

I claim:

1. The process of producing polyvinyl alcohol comprising mixing an alkaline alcoholysis catalyst and a solution of polyvinyl acetate in a solvent selected from the group consisting of methanol and ethanol to provide a mixture containing 30 to 65% by weight of polyvinyl acetate, and heating the mixture at a temperature between about 90° and 150° C. to effect alcoholysis of said polyvinyl acetate.

2. The process of producing polyvinyl alcohol comprising mixing an alkaline alcoholysis catalyst and a methanol solution of polyvinyl acetate to provide a mixture containing 30 to 65% by weight of polyvinyl acetate, and heating the mixture at a temperature between about 90° and 100° C. to effect alcoholysis of said polyvinyl acetate.

3. The process of claim 2 in which the alkaline alcoholysis catalyst is sodium methylate.

4. The process of producing polyvinyl alcohol comprising mixing an alkaline alcoholysis catalyst and a solution of polyvinyl acetate in a solvent selected from the group consisting of methanol and ethanol to provide a mixture containing 30 to 65% by weight of polyvinyl acetate, heating the mixture at a temperature between about 90° and 150° C. to effect alcoholysis of said polyvinyl acetate, agitating the mixture during the alcoholysis, and stopping the alcoholysis by neutralizing said catalyst at a predetermined time interval from the point of maximum power input for the agitation.

5. The process of producing polyvinyl alcohol comprising mixing an alkaline alcoholysis catalyst and a methanol solution of polyvinyl acetate to provide a mixture containing 30 to 65% by weight of polyvinyl acetate, heating the mixture at a temperature between about 90° and 100° C. to effect alcoholysis of said polyvinyl acetate, agitating the mixture during the alcoholysis, and stopping the alcoholysis by inactivating the catalyst at a predetermined time interval from the point of maximum power input for the agitation.

6. The process of producing polyvinyl alcohol comprising mixing a catalytic amount of sodium methylate and a methanol solution of polyvinyl acetate to provide a mixture containing 30 to 65% by weight of polyvinyl acetate, heating the mixture at a temperature between about 90° and 100° C. to effect alcoholysis of said polyvinyl acetate, agitating the mixture during the alcoholysis, and acidifying said sodium methylate at a predetermined time after maximum power input for the agitation has occurred, said predetermined time corresponding to the degree of alcoholysis to be effected in said polyvinyl acetate.

7. The process of producing a polyvinyl alcohol in particulate form comprising mixing an alkaline alcoholysis catalyst and a methanol solution of polyvinyl acetate to provide a mixture containing 30 to 65% by weight of polyvinyl acetate, heating the mixture at a temperature between about 90° and 100° C., agitating the mixture during the alcoholysis, and inactivating said catalyst at a predetermined time interval after maximum power input in the agitation has been reached.

8. The process of producing a partially alcoholized polyvinyl alcohol in particulate form comprising mixing an alkaline alcoholysis catalyst and a solution of polyvinyl acetate in a solvent selected from the group consisting of methanol and ethanol to provide a mixture containing 30 to 65% by weight of polyvinyl acetate, heating the mixture at a temperature between about 90° and 150° C. to effect alcoholysis of said polyvinyl acetate, and agitating the mixture during the alcoholysis, said catalyst losing its activity at a pretermined degree of alcoholysis of said polyvinyl acetate.

References Cited in the file of this patent

UNITED STATES PATENTS

| | | |
|---|---|---|
| 2,109,883 | Herrmann et al. | Mar. 1, 1938 |
| 2,227,997 | Berg | Jan. 7, 1941 |
| 2,266,996 | Scott et al. | Dec. 23, 1941 |
| 2,360,308 | Thomas | Oct. 10, 1944 |
| 2,581,832 | Blume | Jan. 8, 1952 |
| 2,610,359 | Hatchard et al. | Sept. 16, 1952 |
| 2,610,360 | Cline et al. | Sept. 16, 1952 |
| 2,734,048 | Bristol et al. | Feb. 7, 1956 |

FOREIGN PATENTS

| | | |
|---|---|---|
| 629,695 | Great Britain | Sept. 26, 1949 |